Feb. 14, 1933.  J. PEHLKE  1,897,765
DASHPOT FOR WEIGHING MACHINES
Filed July 26, 1930
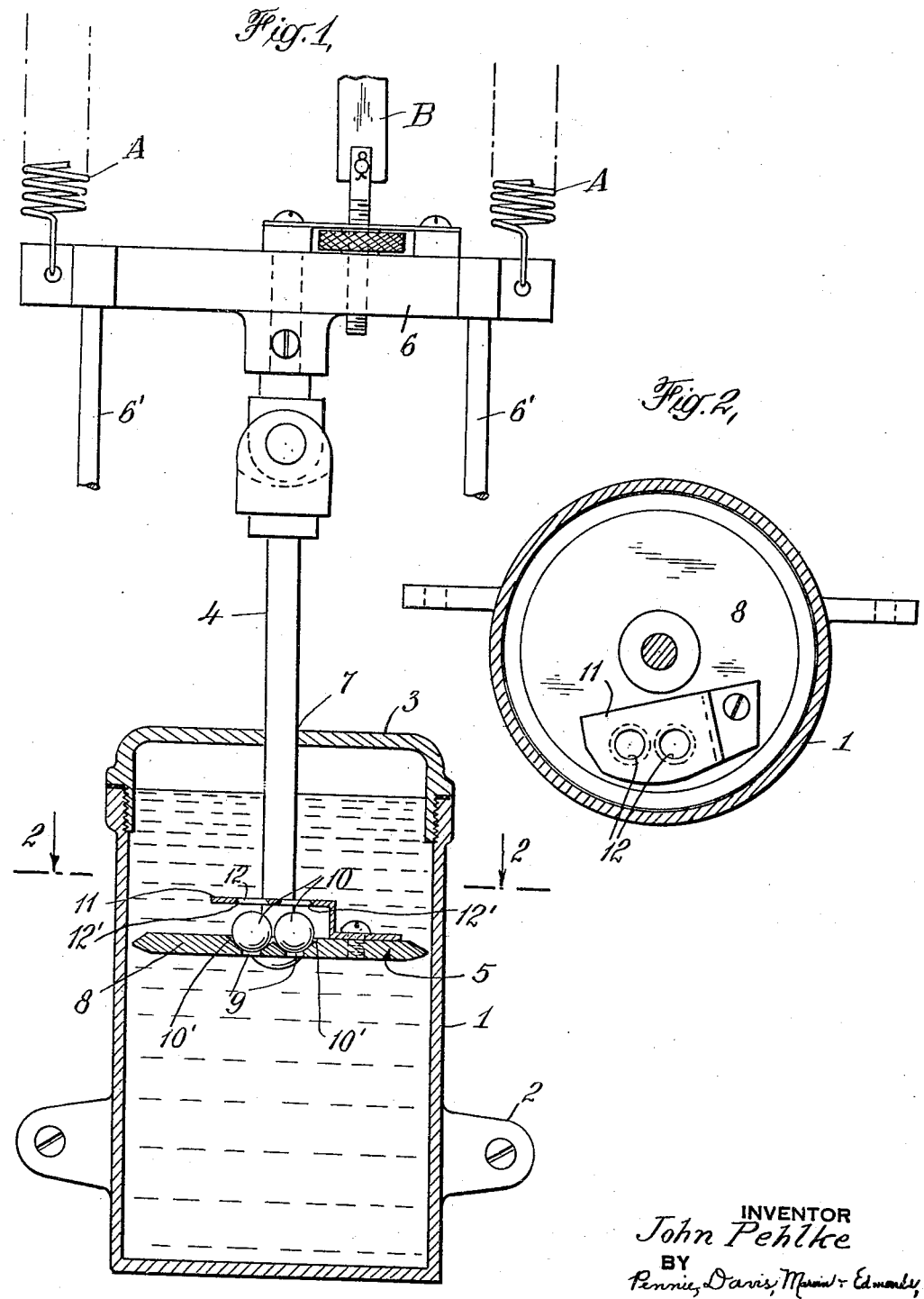
INVENTOR
John Pehlke
BY
Pennie, Davis, Marvin & Edmonds
HIS ATTORNEYS Patented Feb. 14, 1933

1,897,765

UNITED STATES PATENT OFFICE

JOHN PEHLKE, OF CHICAGO, ILLINOIS, ASSIGNOR TO RHODES-HOCHRIEM MANUFACTURING COMPANY, OF CHICAGO, ILLINOIS, A CORPORATION OF ILLINOIS

DASHPOT FOR WEIGHING MACHINES

Application filed July 26, 1930. Serial No. 470,851.

This invention relates to weighing machines, and is particularly concerned with improvements in the construction of the dash-pot for damping the movements of the moving parts, and particularly of the weight-indicating and balancing mechanism.

The weighing machines on which the present invention is an improvement are of the well-known street-type which may be left out in the open the year round. The damping medium in the dash-pot, usually oil, is hence liable to extremes of temperature, resulting in the oil becoming congealed in cold weather, or limpid in hot weather, in either case causing unsatisfactory operation of the machine. This condition obtains either when a by-pass for the displaced oil is employed on the outside of the dash-pot or when the well-known leather flap-valve is used directly on the piston of the dash-pot.

It is the chief object of this invention to provide a weighing machine having a dash-pot on the operation of which the congealing or thinning of the oil caused by the weather will have no appreciable effects, that is, which will work satisfactorily regardless of ordinary changes in viscosity of the damping medium. By the provision of such a dash-pot, the movement of the pointer to the indicating position will always be rapid yet uniform, and the return of the pointer to zero position will always be slow and controlled, the operation in both cases being for all practical purposes independent of the temperature.

A particular object of the invention is to provide an improved type of construction for dash-pots which can be applied to the old dash-pots by an ordinary service man with very little manipulation, so that the weighing machines now on the market may be readily provided with the improvements of the present invention at but little cost and expenditure of time.

My improved machine is shown in the accompanying drawing, in which

Fig 1 is a fragmentary detail view, partly in section, of the improved dash-pot including the balancing and indicating mechanism of the machine, and Fig. 2 is a horizontal section of the dash-pot on line 2—2 of Fig. 1.

The construction shown in the drawing comprises a dash-pot cylinder or container 1 for the oil or other damping fluid, having ears or lugs 2 for use in mounting the device between the uprights of the scale mechanism, or otherwise, in the interior thereof; and a removable cap or closure 3 attached to the cylinder by screw-threads or the like, as shown.

The cylinder carries a piston comprising a piston-rod 4 and a piston-head 5, the piston rod being attached to the vertically moving cross-head 6 of the balancing mechanism of the machine, and being guided in vertical reciprocatory motion according to the movement of the cross-head 6 by the port 7 in the cap. This port may be provided with a packing-gland of any well-known type, if desired. The cross-head 6 has attached to it, the vertical rods 6' which are connected to the platform of the scales, and pull the cross-head down against the action of the balancing springs A. To the cross-head is also attached the link B of the indicating or pointer mechanism. Thus, when a person steps on the platform of the scales, the cross-head 6 will be pulled down, thus forcing the piston down; and when the person steps off, the cross-head and piston will tend to move upwardly.

The piston-head 5 is preferably made in the form of a flat, rather thin disc 8, the periphery of which is double-bevelled, as shown, and the diameter of which is enough less than the inside diameter of the cylinder as to provide a clearance sufficient for a purpose to be hereinafter specified. The piston-head is suitable fixed rigidly to the lower end of the piston-rod, as shown.

The piston-head is also provided with a plurality of vertically extending ports or apertures 9, here shown as two in number. The upper end of each of these ports is countersunk to form a conical valve seat and carries a ball-valve 10. When seated in this conical seat, therefore, the contact between the spheres and the piston-head is limited to the circle of intersection of the cone and sphere. Hence the area of contact on which oil can gum and stick the balls to the head is reduced to the minimum. Therefore, in cold weather or otherwise when the oil tends to gum, the liability of the valves of the dash-pot to stick is reduced to a minimum and the smallest weight usually deposited on the platform is sufficient to unseat the balls and allow the index to swing and the machine to otherwise function as well as in warm weather.

An angled plate 11 is attached to the upper face of the disc by a screw or the like, as shown, with the offset portion of the plate overlying the ports and forming a retainer for the balls 10. This bracket-plate is preferably provided with openings 12 smaller than the balls and allowing them to lift far enough out of the valve seats to permit the free passage of the liquid. These openings are preferably made conical as shown by 12' in order to prevent cutting of the balls.

When a person steps on the platform of the machine, thereby moving the piston-rod downwardly, the damping-fluid in the cylinder, such as oil, is forced upward through the ports 9, lifts the ball-valves 10 and quickly unseats them so that the oil below the piston, instead of being forced outside the cylinder and up through an exposed by-pass pipe and subjected to the rapid congealing effect of low temperatures acting on a small body of oil, or having to encounter a flap-valve liable to be stuck to the piston-head by a congealed film of oil, is, on the contrary, rapidly and freely forced through the ports 9, uncovered by the ball-valves.

The piston is permitted to move downwardly very rapidly at the start, and the initial movement of the correlated mechanism connected to the piston-rod is accomplished freely without lag or retardation. As the balancing and indicating mechanism approaches the limit of its movement, however, the springs to which the piston-rod is attached approach the limit of extension for the load on the scale platform and gradually check the downward movement of the piston. The "hunting" of the index hand over the scale-face, or oscillation of the related mechanism is reduced to a negligible amount.

When the person on the platform steps off, there is a tendency for the moving parts of the balancing and indicating mechanism to immediately fly back into their original position, the spring being suddenly released from tension. There is thus set up an unbalanced force acting directly on the delicate parts of the indicating mechanism, which is apt to result in damage to the indicating mechanism. However, in the machine shown in the drawing, when the tension on the balancing member is released due to the person stepping off the platform, even suddenly, and the piston is pulled upwardly, the relative downward movement of the oil acting on the ball-valves 10, now lightly resting on the seats 10', then forces them down still tighter on seats 10', so as to close the apertures 9, thus instantly checking the upward movement. As the springs are stronger than the resistance set up in the dash-pot, however, and continue to tend to retract, the piston is slowly pulled upwardly and the oil above the piston-head is slowly forced past the bevelled edge of the periphery of the piston-head resulting in a gradual upward movement of the piston and cross-head, sufficiently slow to prevent any unbalanced force coming on the indicating mechanism and pointer.

The movement of the piston is in most cases restricted to a few inches, and there is hence no need for providing overflow connections. When it is necessary to replenish the supply of oil in the cylinder, this can be readily accomplished by merely removing the cap and pouring in the desired quantity of oil. There are no poppet or flap valves to stick or become clogged or gummed by congealing of the oil when the machine is exposed to cold weather.

It is preferable to employ a plurality of valve ports and small ball-valves therefor, as shown, instead of one large such, for the reason that the use of a single large ball-valve would necessitate a single lower seat 10' so large in diameter as to extend almost through the thickness of the piston-head, thus requiring a disc of a prohibitive thickness. In the case of a single large ball, also, the contact surface would be greater than with a plurality of small balls, thus increasing the liability to stick. With a plurality of balls, also, in case one ball should stick, there will be other balls which do not stick.

Various refinements in the mechanical embodiment of the invention may be adopted without exceeding the scope of the invention as defined in the appended claims; for example, instead of connecting the piston-rod to the crosshead of a spring machine, as shown, the rod may be suitably connected to the beam-mechanism of a springless machine; and if desired, water may be used for the damping-medium instead of oil. The cylinder may also be provided with a filling inlet or pet-cock, to obviate the necessity for removing the cap every time the damping medium has to be replenished. The device is preferably cheaply made of cast iron, but other more expensive materials, such as bronze, may of course be substituted for use in the more elaborate machines.

I claim:—

A dash-pot for weighing machines having a weighing head, comprising a piston rod, a liquid-containing cylinder having a port for the passage of the piston rod, a piston head working in the cylinder, said piston head having a cylindrical port therein, the uppermost end of said port being formed into a conical valve-seat opening directly on the top of said piston head, and a ball-valve in said port, the valve seating in the top of said port and contacting said piston head in a circle, and a plate attached by one end to the top of said piston head, the point of attachment thereof lying to one side of the opening, the rest of the plate being angled up over said port and having a port therein in registration with said opening.

In testimony whereof I affix my signature.

JOHN PEHLKE.